Aug. 28, 1951     V. A. SANDER     2,565,631

CURRENT LIMITER SYSTEM

Filed Nov. 28, 1949

Vernon A. Sander,
Inventor,
Haynes and Koenig,
Attorneys.

Patented Aug. 28, 1951

2,565,631

UNITED STATES PATENT OFFICE 2,565,631

CURRENT LIMITER SYSTEM

Vernon A. Sander, St. Louis, Mo., assignor to W. N. Matthews Corporation, St. Louis, Mo., a corporation of Missouri Application November 28, 1949, Serial No. 129,810

4 Claims. (Cl. 171—97)

This invention relates to current limiter systems, and more particularly to circuits including thermostatic current limiters for use in a power distribution system to limit the amount of current drawn by an individual consumer.

This invention is an improvement upon the current limiter circuit disclosed in the application of Carl E. Mosley for Current Limiter, Serial No. 43,890, filed August 12, 1948, now Patent No. 2,518,361, dated August 8, 1950, and in a division of the said Mosley application, Serial No. 129,775, filed November 28, 1949.

The principal object of the invention is the provision of a circuit arrangement utilizing a thermostatic current limiter for use in a three-wire distribution system for automatically disconnecting a secondary or dispensable load element, such as an electric water heater, if the total load drawn by a consumer should exceed the peak limit. A consumer may have, for example, primary load elements such as lights, an electric range, and other electric appliances, and a dispensable or secondary load element, such as an electric water heater, all drawing current from a three-wire supply system. With the present invention, the heater, operation of which may be most conveniently discontinued as regards the other load elements, may be connected to draw current at the full voltage across the outer conductors of the system as long as the total load on one leg of the system does not exceed the peak limit, automatically disconnected whenever the total load exceeds the peak limit, and automatically restored to service when the load drops below the peak limit.

In general, a wiring system of this invention comprises a three-wire single-phase circuit, supplied by a three-wire single-phase service, and including the consumer's primary load elements. The thermostatic part of the current limiter is connected in one leg of the circuit to act in response to current drawn in that leg. A secondary load element, such as a water heater, is connected across the outer legs of the circuit in a line including the switch of the current limiter, the arrangement being such that the switch opens and disconnects the secondary load element if the current drawn in the leg in which the thermostatic device is connected exceeds the peak limit. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a view in side elevation of a current limiter used in a system of this invention;

Similar reference characters indicate corresponding parts throughout the several views of the drawing.

Figure 1:
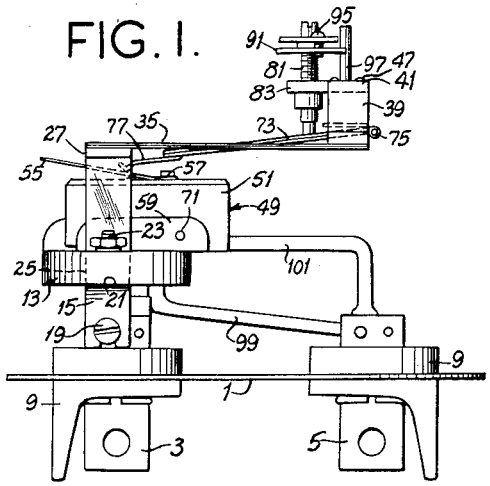
Figure 2:
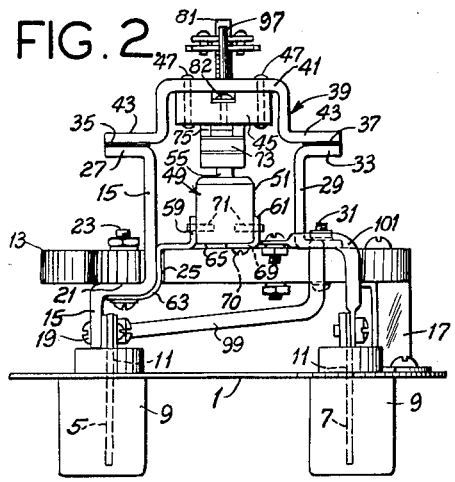
Fig. 2 is an end elevation of Fig. 1 as viewed from the right.

Referring to the drawing, a current limiter used in this invention is shown to comprise a base 1 consisting of a circular metal plate. This carries three main terminals 3, 5 and 7. Each of these main terminals is fixed in an insulation bushing 9 secured in an aperture in the plate to insulate the terminals from the plate. Each main terminal, as illustrated, consists of a flat metal strip, and each bushing has a narrow rectangular opening 11 receiving its respective strip, with the strips extending above and below the plate. At 13 is shown an insulation panel mounted on and above the base 1 by means of posts 15 and 17. The post 15 is a conductor to serve as a terminal and is bolted to the upper end of the terminal 3 as indicated at 19. The post 15 is formed with a step 21 on which the panel 13 bears, the panel being bolted on the step as indicated at 23. The post 15 extends upward from the step above the panel through a slot 25 in the panel, and is formed with an outwardly projecting ear 27 at its upper end. The post 17 does not carry current.

At 29 is shown a conductive terminal post which extends upward from the panel 13 parallel to the post 15. The post 29 is secured at its lower end to the panel as indicated at 31 and has an outwardly projecting ear 33 at its upper end at the level of the ear 27 on the upper end of the post 15. Current-heated thermostatic blades 35 and 37 are secured at one end upon the ears 27 and 33, respectively, as by welding, and are cantilevered outward in the same direction from the ears in coplanar, laterally spaced, parallel relation. The two blades are of substantially the same length and have substantially the same temperature-displacement characteristics. Each blade is arranged to bend up upon heating, down upon cooling. For example, the blades may be bimetallic with their low coefficient of thermal expansion sides on top.

The free ends of the blades are connected by a conductive connecting member 39. This comprises a bar bent to have a U-shaped central portion 41 with flanges 43 extending outward from the ends of the arms of the U. The flanges 43 are secured to the upper sides of the free ends of the blades as by welding with the U-shaped central portion opening downward. A block of thermal (and electrical) insulation 45 is secured within the U by means of bolts 47. Member 39 is free to move up upon heating of blades 35 and 37, down upon cooling.

A snap-acting switch 49 is mounted on the panel 13 between the posts 15 and 29. This switch is of a type which is conventional in the art, having an insulation case 51 housing the switch contacts and the snap-acting switch-actuating mechanism, and having an operating button 53 (Fig. 4) projecting upward through an opening in the top of the switch case. It also has a resilient lever 55 fixed at one end to the top of the case as indicated at 57 and extending over the button. The lever 55 is normally raised and may be pushed downward against its inherent bias to push in the button and open the switch, the switch being normally closed. When the lever is raised, the button moves upward and the switch re-closes.

The switch is held upon the panel 13 between conductive switch-holding members 59 and 61 secured to the panel to extend along the sides of the switch case. The member 59 has a portion 63 which reaches through the slot 25 in the panel and which is held in place by the bolt 23 holding the panel on the step 21. This also serves electrically to connect the post 15 and the member 59. The member 59 also has a portion 65 reaching under the switch case which is connected to one terminal 66 of the switch. The member 61 is fastened to the panel at 67 and has a portion 69 reaching under the switch case which is connected to the other terminal 70 of the switch. The switch case is held in place between the members 59 and 61 by means of pins 71 extending from the case through holes in the members.

A thermostatic blade element 73 is pivoted at 75 to the insulation block 45 carried by the member 39 and extends from the pivot under the block and centrally between the blades 35 and 37. The blade 73 carries a finger 77 at its free end which bears on the switch-actuating lever 55. The blade 73 is pivoted at 75 to a hinge leaf 79 fixed to the bottom of the block 45 by a bolt 80, the pivotal axis being transverse to the center line between the blades 35 and 37. The blade 73 is arranged so that its free end carrying finger 77 moves upward on heating, downward on cooling. For example, the blade 73 may be a bimetallic blade with its low coefficient of thermal expansion side on top. As illustrated, the blade 73 is shorter than the blades 35 and 37 and it is made thicker than blades 35 and 37.

Figure 4:
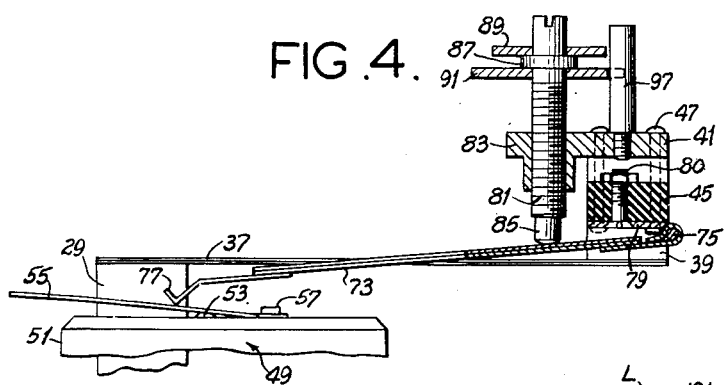
Fig. 4 is an enlarged fragmentary section taken on line 4—4 of Fig. 3.
Figure 3:
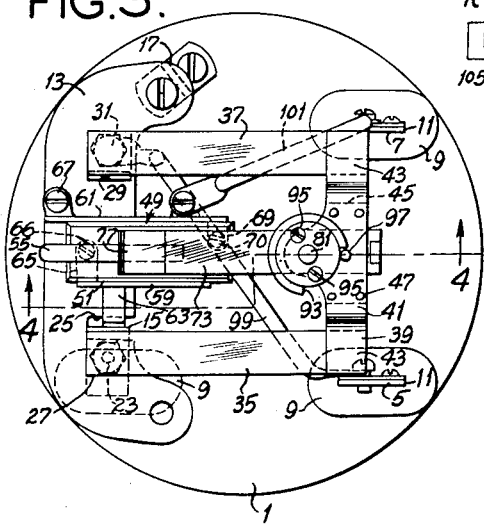
Fig. 3 is a plan view of Fig. 1.

The finger 77 on the free end of the blade 73 is adapted to be maintained in pressure engagement with the operating lever 55 of switch 49 by means of a screw 81 threaded in an ear 83 formed on the member 39, the screw being located between the pivot 75 and the free end of the blade 73 near the pivot. The screw has a tip 85 of thermal insulation bearing against the upper side of the blade 73. Adjacent its upper end, the screw has a flange 87 (Fig. 4). Bearing against the top of this flange is a head 89 and bearing against the bottom of the flange is a stop disc 91 larger than the head having a notch 93 in its periphery (Fig. 3). The head and disc are tied together by screws 95, which releasably clamp them against the flange so that, by loosening the screws 95, the angular position of the head and disc on the screw 91 may be varied. A stop pin 97 extends upward from the member 39 through the notch 93 to limit the rotation of the screw to the arcuate extent of the notch. It will be seen that the pressure of the finger 77 on the lever 55 may be varied by turning the screw 81 to move it up or down.

The main terminal 5 is electrically connected to the terminal post 29 by means of a conductive rod 99. The main terminal 7 is electrically connected to the member 61 by means of conductive rod 101. The main terminal 3, as previously described, is directly connected to the terminal post 15.

The blades 35 and 37, the connecting member 39 and the blade 73 form a generally E-shaped thermostatic device having its outer current-carrying legs 35 and 37 joined at one of their ends by the electrically conductive connecting member 39 and its central thermostatic leg 73 extending from the connecting member 39 between the outer legs, and thermally insulated from the member 39 by the block 45. The outer legs are fixed at their outer ends to the posts 15 and 29, which form terminal elements, and are cantilevered outward from the terminal posts 15 and 29 so that the connecting member is freely movable in response to temperature change as the outer legs 35 and 37 flex. As herein illustrated, the connecting member 39 moves up when legs 35 and 37 are heated, down when they cool.

Figure 5:
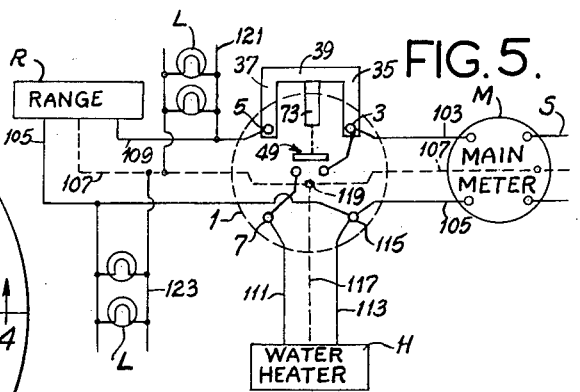
Fig. 5 is a wiring diagram illustrating a mode of connecting the current limiter shown in Figs. 1 to 4 in a consumer's circuit.

Fig. 5 illustrates a circuit arrangement of this invention wherein the above-described current limiter is connected in a three-wire single-phase system supplying a consumer's load requirements shown as including an electric range R, an electric water heater H, lights and other load elements L. The supply circuit or service is shown at S, with the neutral wire of the circuit shown as a dotted line. At M is shown the usual main electric meter, from which lead outer conductors 103 and 105 and a neutral wire 107, the latter being shown as a dotted line. The conductor 103 is connected to the terminal 3 of the current limiter. A conductor 109 is connected to the terminal 5 of the current limiter. The range R is connected across conductors 105 and 109 and grounded by the neutral wire 107. It will be understood that some types of ranges have switches permitting connection of the heater element to either the outer legs or to an outer leg and the neutral so as to provide different amounts of heat. The heater H is connected across conductors 103 and 105 in a circuit including the switch 49 by means of a wire 111 connected to one terminal of the heater and to the terminal 7 of the current limiter and a wire 113 connected to the other terminal of the heater and to the wire 105 at 115. The heater is grounded by a neutral wire 117 connected to the neutral wire 107 at 119. The load elements L are connected in two separate circuits 121 and 123, which are generally of approximately equal load, one being connected across conductor 109 and neutral wire 107 and the other across conductor 105 and neutral wire 107.

In operation, current flows in series through thermostatic element 35, member 39 and thermostatic element 37 of the E-shaped thermostatic device. The thermostatic elements 35 and 37 are thereby heated to a degree dependent upon the current value. The value of the current flowing through the thermostatic device is dependent upon the load imposed by the range R and the load elements L in circuit 121. Whenever the current drawn by the range and load elements L in circuit 121 exceeds a predetermined peak value, as determined by the setting of the screw 81, the thermostatic elements 35 and 37 are heated to such an extent that the member 39 moves upward and acts through the blade 73 to open the switch 49, thereby disconnecting the water heater H. When the current drops below the peak value, the elements 35 and 37 cool, member 39 moves downward, and the switch 49 closes to re-connect the heater H. The arrangement is such that the customer may, if desired, voluntarily reduce the load imposed by the range R or the load elements L in circuit 121 below the peak value to maintain the heater connected.

The peak value may be varied within limits by varying the adjustment of the screw 81. By adjusting the screw downward, thereby increasing the pressure of the finger 77 on the switch lever 55, the peak value may be reduced, and by adjusting the screw upward, the peak value may be raised. Suitable indicia indicating the peak values that may be set may be scribed on the head 89 and read in conjunction with pin 97 as an index.

As shown in Fig. 5, the heater H is connected in the circuit on the supply side of the current limiter, and the current drawn by the heater has no effect on the current limiter. That is, the current limiter is solely responsive to current flow in the leg of the circuit in which the E-shaped thermostatic device is connected. The switch 49 effects solely the operation of the water heater H (secondary load element).

The central thermostatic leg 73 of the E-shaped thermostatic device does not carry current, being electrically as well as thermally insulated from the member 39 by the insulation block 45. This thermal insulation of the leg 73 from the member 39 is important because it prevents leg 73 from being heated by conduction and changing the operating characteristics. The central leg 73 acts as a switch-operating arm and is made thermostatic to afford ambient temperature compensation by reason of the fact that as member 39 moves in response to ambient temperature changes, the end of the leg 73 moves in such direction as to counteract the movement of the member 39. For example, if the ambient temperature increases and member 39 moves upward in switch-opening direction, the free end of leg 73 moves upward to offset the tendency of member 39 to open the switch. The leg 73 is made thicker than the legs 35 and 37 as it bears a greater mechanical load and its length is made such as to afford the necessary deflection of its free end for ambient temperature compensation. The hinging of the leg 73 to the member 39 is an important feature as it has the advantage of eliminating the effect of any difference between the temperature-displacement characteristics of legs 35 and 37.

Cross reference is made to my copending divisional application entitled Current Limiter, Serial No. 145,227, filed February 20, 1950.

In view of the above, it will be seen that the several objects of the invention are achieved and other advantageous results attained.

As many changes could be made in the above construction without departing from the scope of the invention, it is intended that all matter contained in the above description or shown in the accompanying drawing shall be interpreted as illustrative and not in a limiting sense.

I claim:

1. In a three-wire single-phase wiring system having a neutral and two outer legs, a primary electrical load connected across the neutral and one outer leg, another primary electrical load connected across the neutral and the other outer leg, the net load on each outer leg being approximately the same, a current limiter comprising a current heated thermostatic device and a switch mechanically coupled thereto for operation upon flow of a predetermined value of current, said thermostatic device being connected in only one of the outer legs of the wiring system, and a secondary load element connected to said one outer leg on the supply side of the thermostatic device in a line including said switch, said thermostatic device being solely responsive to current flow in one outer leg to the primary loads and said switch effecting solely the operation of said secondary load element.

2. In a three-wire single-phase wiring system having a neutral and two outer legs, a primary electrical load connected across the neutral and one outer leg, another primary electrical load connected across the neutral and the other outer leg, the net load on each outer leg being approximately the same, and a current limiter comprising a current heated thermostatic device and a switch mechanically coupled thereto for operation upon flow of a predetermined value of current, said thermostatic device being connected in one of the outer legs of the wiring system, and a secondary load element connected across the two outer legs on the supply side of the thermostatic device in a line including said switch, said thermostatic device being solely responsive to current flow to the primary loads and said switch effecting solely the operation of said secondary load element.

3. In a three-wire single-phase wiring system having a neutral and two outer legs, a primary electrical load connected across the neutral and one outer leg, another primary electrical load connected across the neutral and the other outer leg, the net load on each outer leg being approximately the same, a primary load element connected across the outer legs, and a current limiter comprising a current heated thermostatic device and a switch mechanically coupled thereto for operation upon flow of a predetermined value of current, said thermostatic device being connected in only one of the outer legs of the wiring system, and a secondary load element connected across the outer legs on the supply side of the thermostatic device in a line including said switch, said thermostatic device being solely responsive to current flow in said one outer leg to the said primary loads and the primary load element and said switch effecting solely the operation of said secondary load element.

4. In a three-wire single-phase wiring system having a neutral and two outer legs, a primary electrical load connected across the neutral and one outer leg, another primary electrical load connected across the neutral and the other outer leg, the net load on each outer leg being approximately the same, a primary load element connected across the outer legs; and a current limiter comprising a current heated thermostatic device and a switch mechanically coupled thereto through a snap-acting linkage for operation upon flow of a predetermined value of current, said thermostatic device being connected in one of the outer legs of the wiring system, and a secondary load element connected across said legs on the supply side of the thermostatic device in a line including said switch, said thermostatic device being solely responsive to current flow to the said primary loads and the primary load element and said switch effecting solely the operation of said secondary load element.

VERNON A. SANDER.

REFERENCES CITED

The following references are of record in the file of this patent:

UNITED STATES PATENTS

| Number | Name | Date |
|---|---|---|
| 1,743,115 | Clark | Jan. 14, 1930 |
| 1,749,718 | Randolph | Mar. 4, 1930 |
| 1,873,238 | Wood | Aug. 23, 1932 |
| 1,956,067 | Hery | Apr. 24, 1934 |
| 1,985,100 | Kuhn et al. | Dec. 18, 1934 |
| 2,098,986 | Winters | Nov. 16, 1937 |